United States Patent Office.

JEREMIAH C. TILTON, OF SANBORNTON BRIDGE, NEW HAMPSHIRE.

Letters Patent No. 82,660, dated September 29, 1868.

IMPROVED COMPOSITION FOR DRESSING HAIR.

*The Schedule referred to in these Letters Patent and making part of the same.*

TO ALL WHOM IT MAY CONCERN:

Be it known that I, JEREMIAH C. TILTON, of Sanbornton Bridge, in the county of Belknap, and State of New Hampshire, have invented a composition of matter forming a new and improved Hair-Dressing; and I hereby declare the following to be a clear and exact description of the method I use in compounding and preparing the same.

My composition or preparation is designed to be used both as a hair-dressing and a renovator for restoring gray and faded hair to its original color, and promoting its growth, and is so prepared in a solid form as to be used and applied to the hair without the annoyance and evils incident to the use of liquid preparations, and it is also rendered convenient for transportation and carrying about the person.

To enable others skilled in the art to make and compound my preparation, I will describe the process and ingredients used by me in manufacturing the same.

To make the accompanying roll of two ounces, (2℥,) I grind or mix thoroughly, in a mill or mortar, two drachms (2ʒ) of lac or precipitate of sulphur, one drachm (1ʒ) superacetate of lead, (sugar of lead,) six drachms (6ʒ) glycerine, and one-half drachm (1ʒ 10 gr.) borax. Into a suitable vessel I then put three and one-half drachms (3ʒ 10 gr.) of spermaceti, and three drachms (3ʒ) of Barbary tallow, (or wax,) and bring the whole to a melted state over a fire. To this I then add the mixture of the ingredients above named, and when the two are thoroughly intermixed, I add whatever I may use to give it the desired perfume, and pour it off into a mould to cool.

When the roll has become solid, I remove it from the mould and cover it with tin-foil, or tissue or other paper of delicate texture, and apply to it a coating of shellac or other gum to preserve it from the action of the air. The paper or tin-foil used for this purpose should be of such nature as to present no obstacle to the use of the dressing when applying it to the hair.

The roll may be colored by the addition to the spermaceti of a small quantity of any coloring-matter that will produce the desired effect, and not be injurious to the skin or hair.

It is evident that a larger quantity of the compound may be made by increasing the quantity of the ingredients in the proportion above named. This proportion I have set out as the best known to me for preparing my composition, but some or all of them may be slightly varied without departing from the nature of my invention.

Having thus fully described my invention, I claim—

The composition of matter made of the within-named ingredients, in or about the proportion set forth.

JEREMIAH C. TILTON.

Witnesses:
RUFUS G. L. BARTLETT,
ARCHIBALD S. CLARK.